(No Model.)
M. O. REEVES.
SECURING PULLEYS TO SHAFTS.
No. 473,524. Patented Apr. 26, 1892.
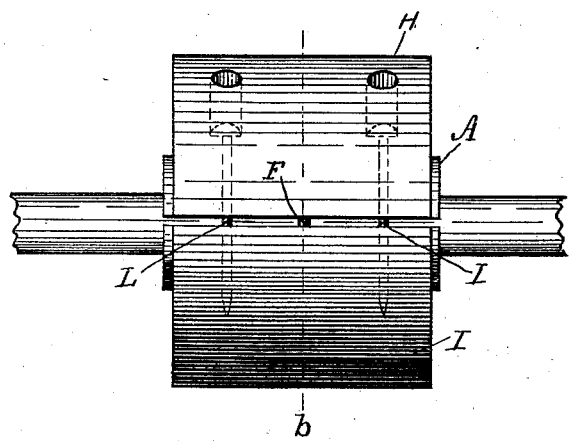
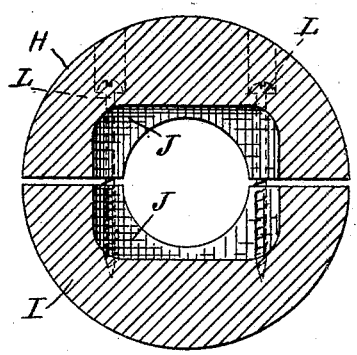
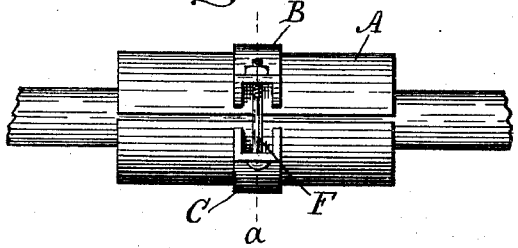
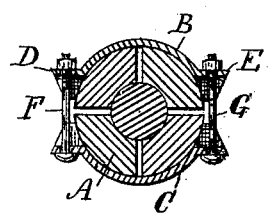
WITNESSES:
U. M. Hood.
Mabel Hood.
INVENTOR
Milton O. Reeves
BY
H. P. Hood.
ATTORNEY.

UNITED STATES PATENT OFFICE.

MILTON O. REEVES, OF COLUMBUS, INDIANA, ASSIGNOR TO THE REEVES PULLEY COMPANY, OF SAME PLACE.

SECURING PULLEYS TO SHAFTS.

SPECIFICATION forming part of Letters Patent No. 473,524, dated April 26, 1892.

Application filed January 22, 1892. Serial No. 418,892. (No model.)

*To all whom it may concern:*

Be it known that I, MILTON O. REEVES, a citizen of the United States, residing at Columbus, in the county of Bartholomew and State of Indiana, have invented a new and useful Improvement in Securing Pulleys to Shafts, of which the following is a specification.

My invention relates to an improved method of and means for securing split pulleys to shafting, and is designed more particularly for webless pulleys of small diameter, but may also be used on all pulleys having a segmental bushing.

The object of my improvement is to provide means for clamping the bushing to the shaft independently of and in addition to the means for clamping the halves of the split pulley together.

The accompanying drawings illustrate my invention.

Figure 1 represents a side elevation of the bushing clamped to the shaft. Fig. 2 represents a transverse section of same at *a*, Fig. 1. Fig. 3 represents a side elevation of the pulley and its bushing in position on the shaft. Fig. 4 is a transverse section of the pulley at *b*, Fig. 3.

In the drawings, A is the bushing, consisting of two or more segments adapted interiorly to fit the shaft and exteriorly to fit a central longitudinal opening in the pulley in the usual well-known manner. Mounted upon opposite sides of the bushing is a pair of semicircular metallic clamps B and C, having at opposite ends laterally-projecting extensions D and E, adapted to receive a pair of clamping-bolts F and G, which pass through the ends of the clamps. The inner surfaces of clamps B and C fit nicely over the exterior of the bushing on opposite sides thereof, and the segments of the bushing are strongly clamped to the shaft independently of the pulley by means of the clamps and the bolts F and G.

The halves H and I of the pulley are each provided with a central longitudinal opening which fits closely over the exterior of the bushing in the usual manner, and are each provided also with a central interior recess J, which fits loosely over the clamps B and C. The halves of the pulley are secured together by wood-screws L L or other suitable bolts, by means of which the pulley is clamped to the bushing and the bushing is clamped to the shaft.

Heretofore in this class of pulleys the bushing has been held to the shaft by the clamping mechanism of the pulley-sections only, thus necessitating the simultaneous application of the pulley-sections and the bushing-sections to the shaft, and the grip of the pulley and bushing upon the shaft has depended wholly upon the mechanism for clamping the halves of the pulley together.

By my improved method of and means for securing the bushing the bushing is first applied to the shaft and strongly clamped thereon, and the pulley is then clamped together upon the bushing. I have shown but one set of clamps applied at about the middle of the bushing.

It is obvious that two or more pairs of clamps may be applied to the bushing when the pulley is of sufficient width of face.

I claim as my invention—

The combination of the shaft, the segmental bushing adapted to fit thereon, the pair of metallic clamps adapted to embrace the exterior of the bushing between them, the bolts arranged to draw said clamps together, and the pulley-sections each having a central opening adapted to embrace the exterior of the bushing and an interior recess adapted to receive the clamp, and means for clamping the pulley-sections together, all arranged to co-operate substantially as set forth.

MILTON O. REEVES.

Witnesses:
JOHN JEWELL,
D. T. MCNIEL.